Aug. 8, 1967   S. E. HUBBARD   3,334,375
CASTER FOR SLIDING PANEL
Filed Aug. 4, 1965   9 Sheets-Sheet 1

INVENTOR:
S. EUGENE HUBBARD
BY
ATT'YS

Aug. 8, 1967 S. E. HUBBARD 3,334,375
CASTER FOR SLIDING PANEL
Filed Aug. 4, 1965 9 Sheets-Sheet 2
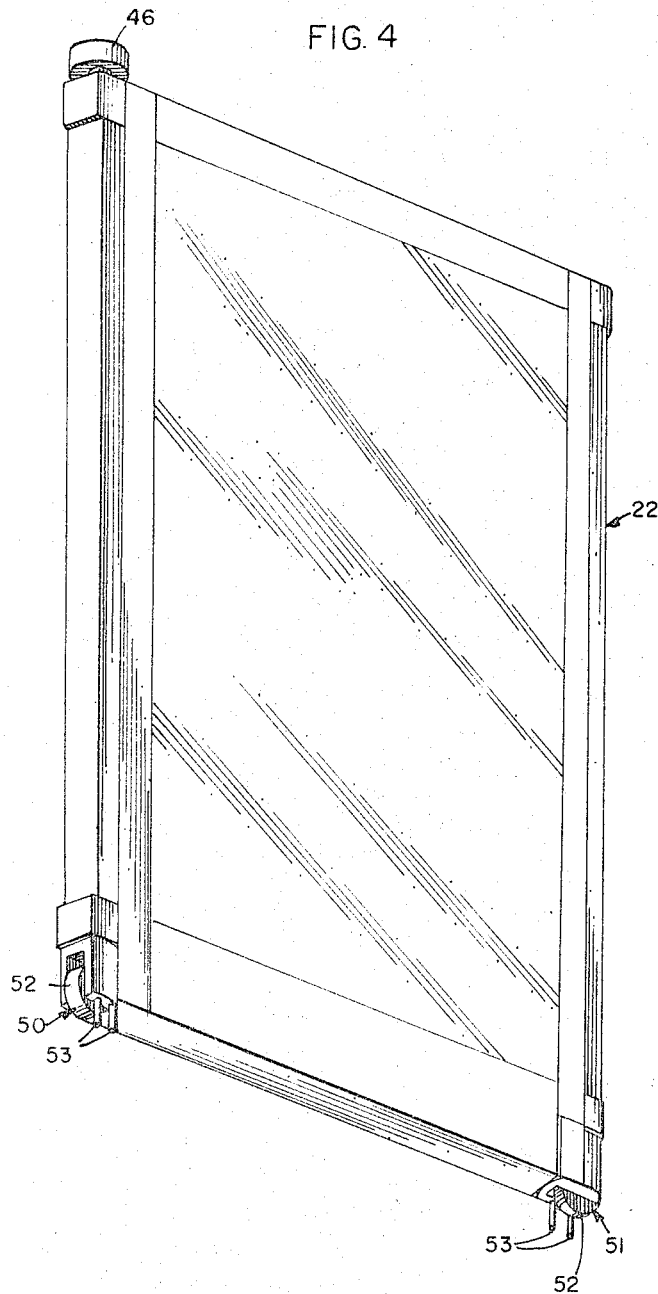
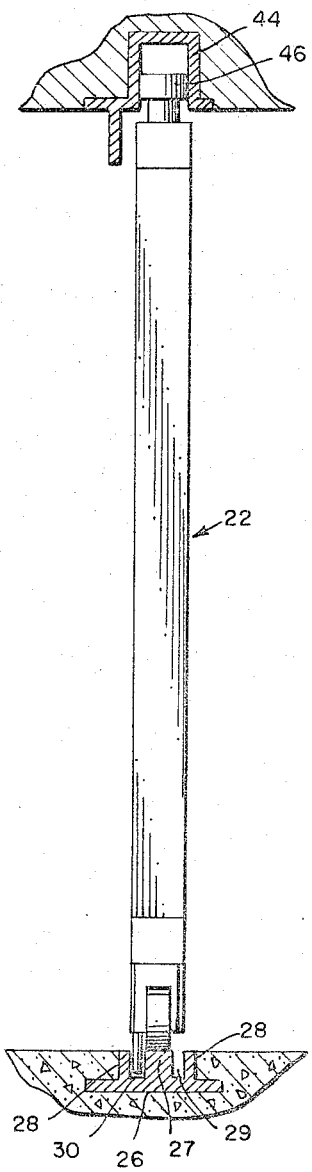
INVENTOR:
S. EUGENE HUBBARD
BY
ATT'YS

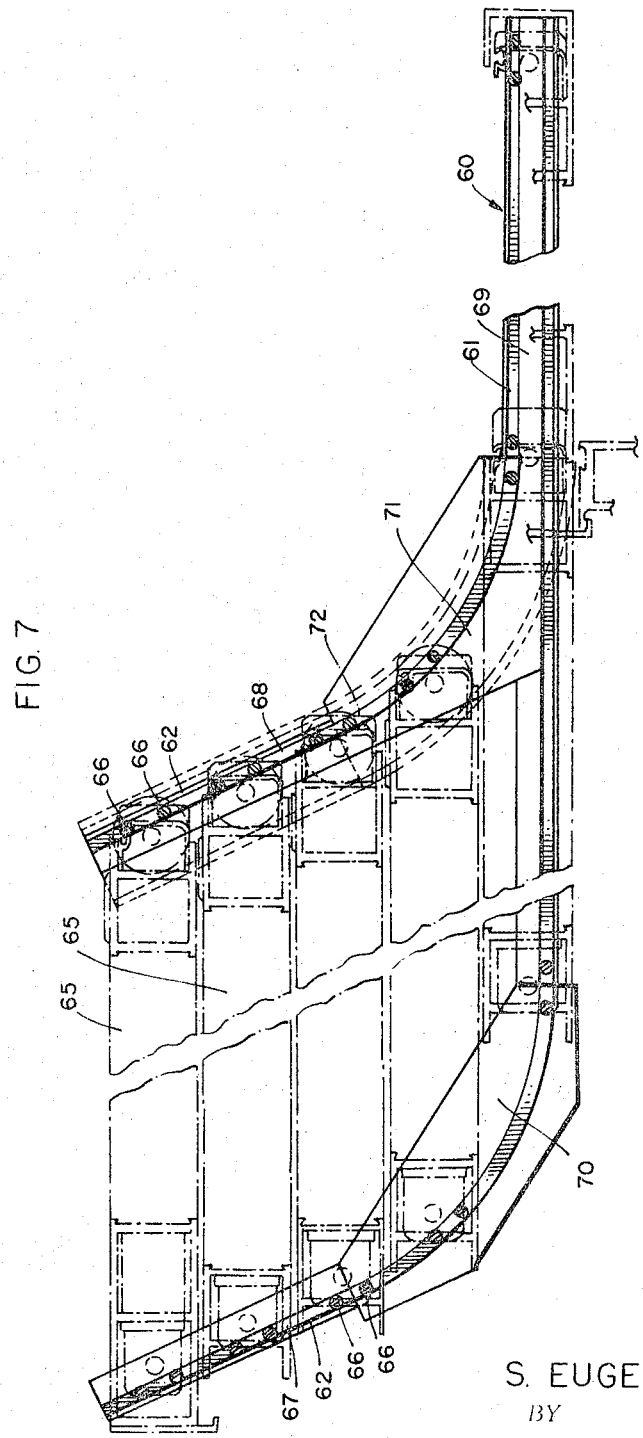

Aug. 8, 1967 S. E. HUBBARD 3,334,375
CASTER FOR SLIDING PANEL
Filed Aug. 4, 1965 9 Sheets-Sheet 5

INVENTOR:
S. EUGENE HUBBARD
BY
Mason, Kolehmainen, Rathburn & Wyss
ATT'YS

Aug. 8, 1967
S. E. HUBBARD
3,334,375
CASTER FOR SLIDING PANEL
Filed Aug. 4, 1965
9 Sheets-Sheet 6
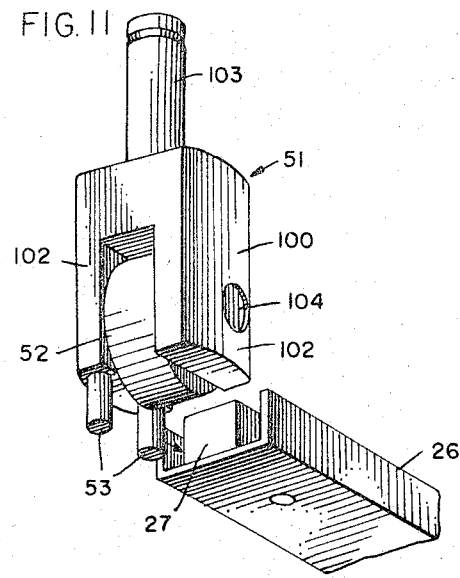
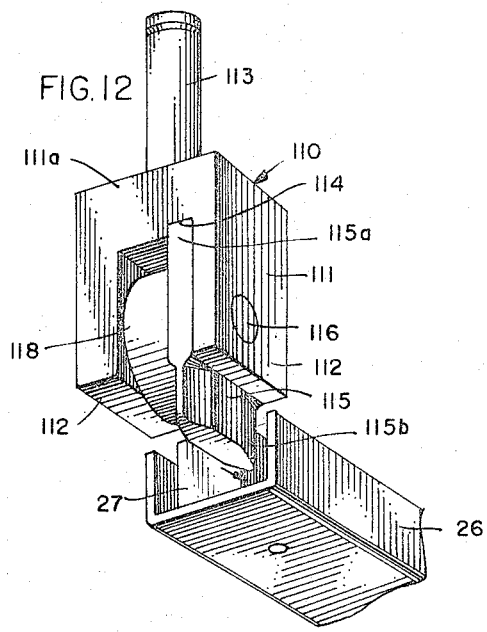
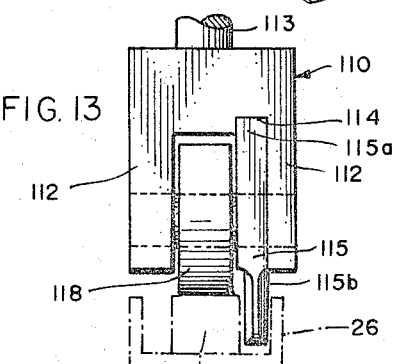
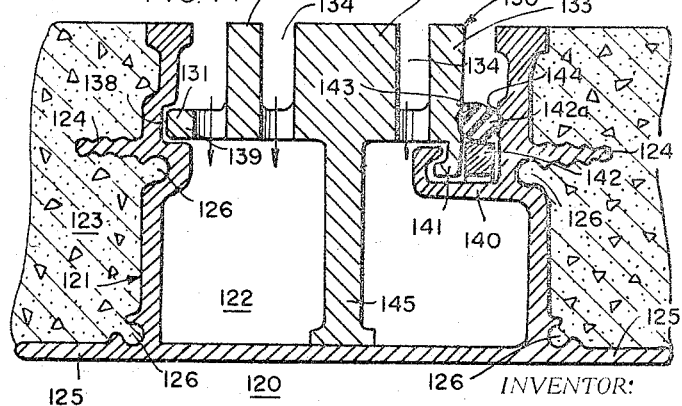
INVENTOR:
S. EUGENE HUBBARD
BY
Mason, Kolehmainen, Rathburn & Wyss
ATT'YS

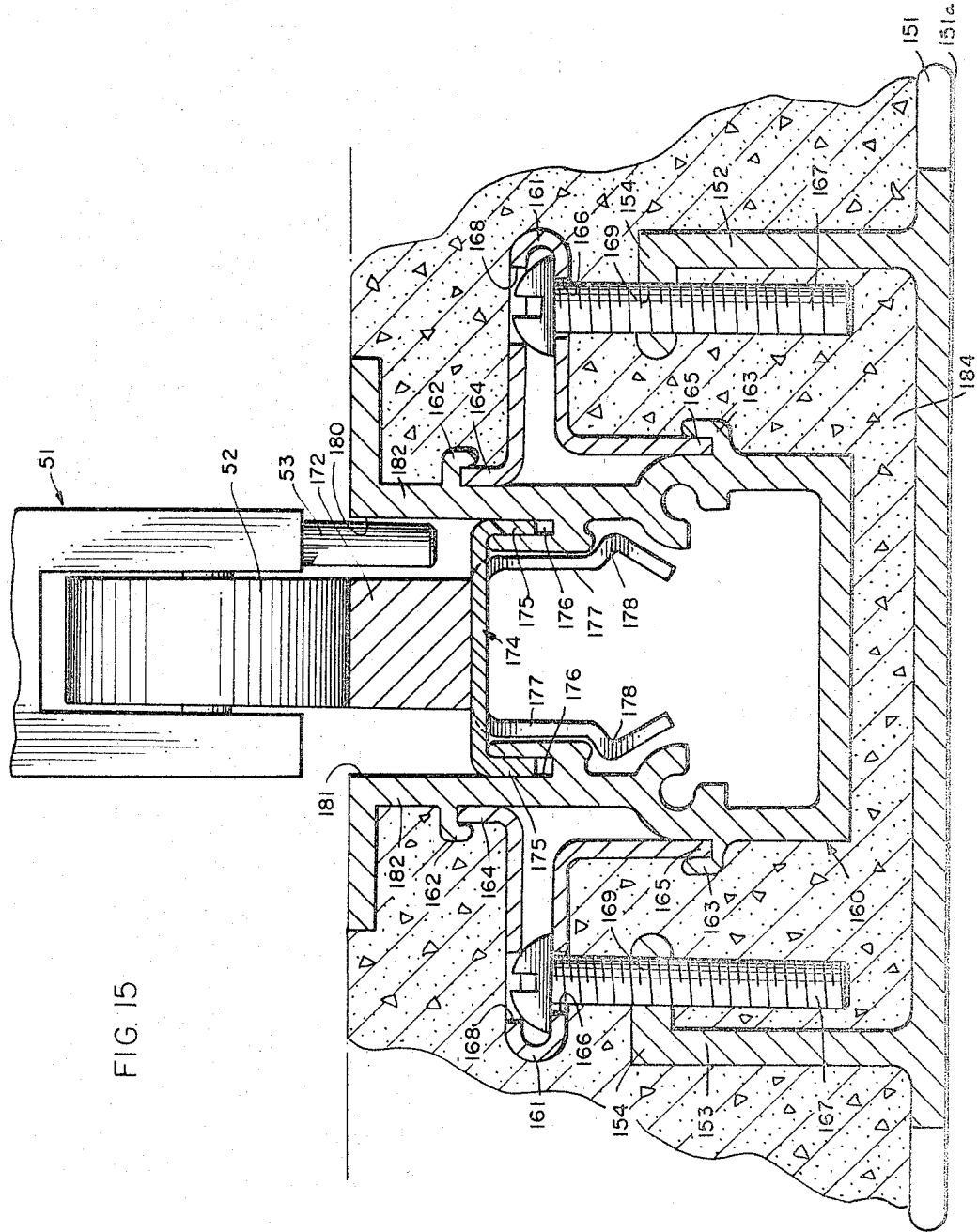

Aug. 8, 1967  S. E. HUBBARD  3,334,375
CASTER FOR SLIDING PANEL
Filed Aug. 4, 1965  9 Sheets-Sheet 8
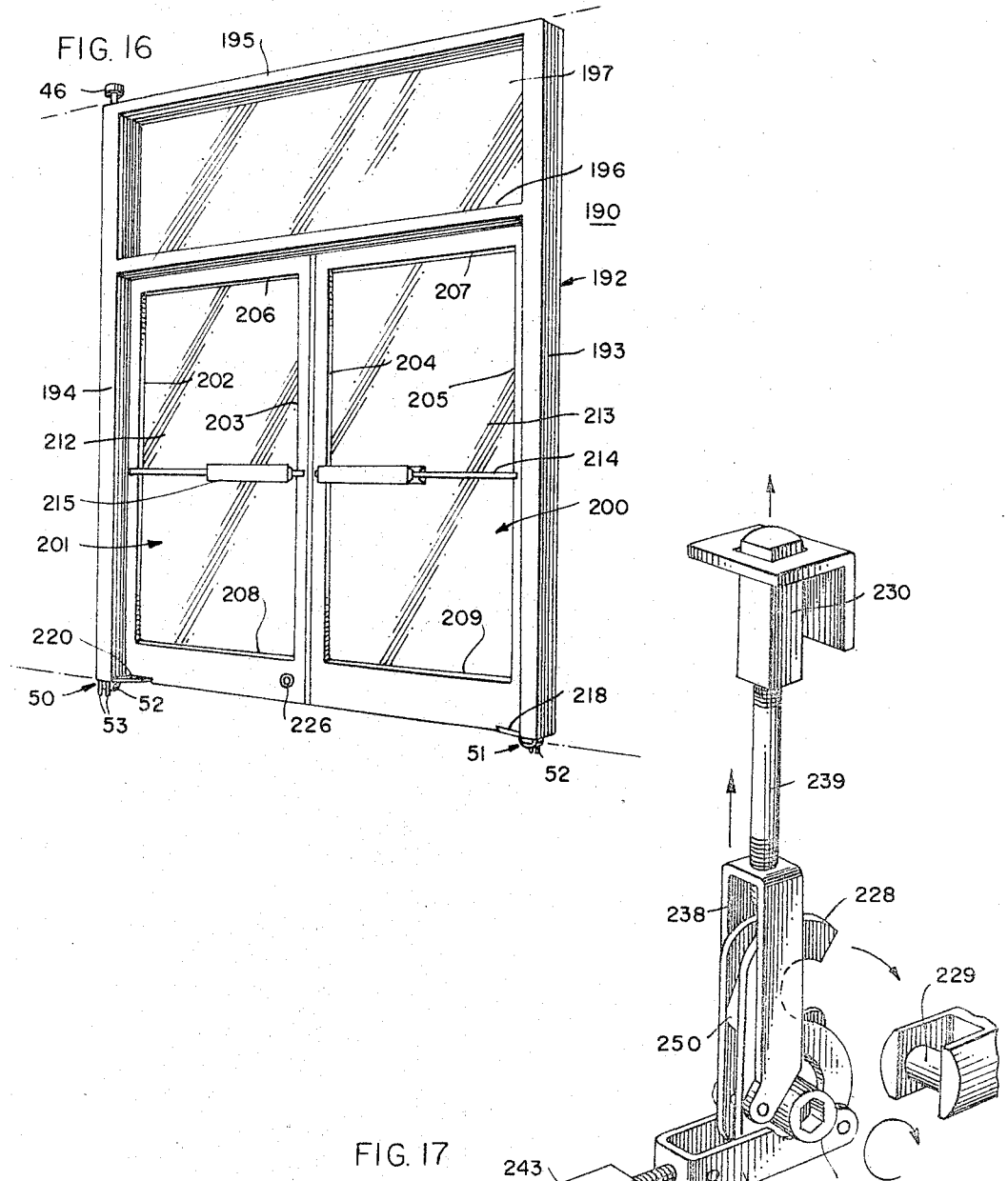
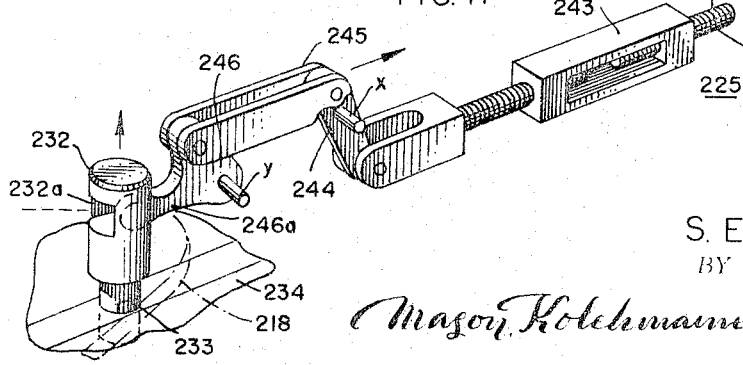
INVENTOR:
S. EUGENE HUBBARD
BY
Mason, Kolehmainen, Rathburn & Wyss
ATT'YS Aug. 8, 1967  S. E. HUBBARD  3,334,375
CASTER FOR SLIDING PANEL
Filed Aug. 4, 1965  9 Sheets-Sheet 9

INVENTOR:
S. EUGENE HUBBARD
BY
Mason Kolehmainen, Rathburn & Wyss
ATT'YS

United States Patent Office 3,334,375
Patented Aug. 8, 1967

3,334,375
CASTER FOR SLIDING PANEL
S. Eugene Hubbard, Niles, Mich., assignor to American Metal Climax, Inc., New York, N.Y., a corporation of New York
Filed Aug. 4, 1965, Ser. No. 477,188
3 Claims. (Cl. 16—97)

ABSTRACT OF THE DISCLOSURE

An improved sliding wall system is provided with a track having spaced apart grooves. Each sliding panel is provided with a pair of lower guided casters, each caster having a projection extending into a respective one of the grooves. Thus the panel is guided along the two grooves such that the panels can be made to stack without the necessity of complex switching and the like.

---

The present invention relates to a new and improved sliding wall panel system and, more particularly, to a system of components for the construction of operable wall panels such as used on store and building fronts, and to new and improved sliding wall panels and improved hardware therefor.

Such sliding building fronts, consisting usually of large glazed panels and manually-operated swinging-door entrances, are useful where it is desired to effect immediate change from open-air to enclosed operation in response to weather, seasonal, or merchandising changes.

Operable wall panels or store fronts have been in part an outgrowth of the very rapid development brought about by the dramatic introduction of the enclosed mall shopping center. They differ from sliding doors not only in size, but in that they are customarily exposed to the weathering and structural forces characteristic of stationary building fronts. Moreover another point of difference is that they must include within their own boundaries fully practical entrance doors for use during periods when for reasons of weather or season the front as a whole is closed.

Prior attempts to redesign existing sliding panels had not been entirely satisfactory. Moreover such redesigned assemblies have fallen short of the accepted standards for architectural metal with respect to economy, appearance, durability, and adaptability. The need, for structural reasons, to build complete metal frames around the glass has resulted in an unpleasingly bulky appearance when the frames are in place in the opening. The unusual stresses imposed on the joints, as well as the absence of integral means of joining members to one another has led to unsightly compromises in joinery and to the use of numerous exposed fastenings. The large inertia of the large panes of glass and the inability with improvised members adequately to restrain the glass cast doubt upon the permanence of the joints and has an adverse effect on the rigidity of the assembly.

Moreover the frequent necessity in the past for a separate track for each panel has generally led to the requirement of staggered panels or to extremely wide panels and deep pockets. The resulting impositions on building architecture and on the ease of operation have unquestionably acted to deter more widespread adoption.

An operable front or panel in place in the opening must withstand exactly the same forces as a fixed front. But when it is moved it must withstand entirely different ones. These forces, as well as the fact of operability, must be provided for within an appearance context that is in keeping with present day architectural styles. Finally the product must have an organic continuity with other structural components.

When a panel is moved, different loads are applied than affect a stationary panel. The effect of the glass weight remains the same, of course. The wind loads must be considered as being still effective: while in most cases the panel would not be operated in a storm, there could arise instances in which it would have to be closed for protection against suddenly rising winds. A new factor is bending in the stile as a result of rolling or weathering friction. From the same source there are parallelogram distortions and twisting of the stiles.

As to operable doors within the panel, there is a certain amount of sag due to the weight of the glass. Moreover as a result of ordinary track irregularities some oscillation during movement occurs. Even if this oscillation were not sufficient to cause the doors to drag or bang together, it would nevertheless impose excessive loads on the panel joints, requiring special reinforcement or leading to their ultimate destruction.

One commercial solution to the operable entrance door panel is to use a floating threshold. Hopefully this would be mounted sufficiently low to prevent tripping or slapping when stepped on and sufficiently high to avoid dragging. It is self evident that such a perfect location is seldom achieved. Another approach on the operable door panel is by the provision of a saddle running in the hollow floor guide track below the floor level. Neither of these solutions, however, is completely satisfactory with regard to compressive loads as would arise from pushing instead of pulling the entrance unit.

Accordingly one object of the present invention is to provide a new and improved sliding wall panel system which overcomes the aforementioned difficulties.

Yet a further object of the present invention is to provide a wall panel system having a new and improved sliding and storage geometry.

Yet a further object of the present invention is to provide a new and improved sliding panel structure wherein the individual panels are mounted in line on a single track.

Yet a further object of the present invention is to provide a new and improved caster for a sliding panel.

Yet a further object of the present invention is to provide a new and improved sliding panel having an operable entrance door within the panel.

Yet a further object of the present invention is to provide a new and improved track for a sliding wall panel.

Yet a further object of the present invention is the provision of a new and improved self draining track for a sliding wall panel.

Yet another object of the present invention is to provide a new and improved track for a sliding wall panel which is adapted to power tool fastening to the structure.

Yet another object of the present invention is the provision of a track for a sliding wall panel which has new and improved leveling means.

Further objects and advantages of the present invention will become apparent as the following description proceeds and the features of novelty which characterize the invention will be pointed out with particularity in the claims annexed to and forming a part of this specification.

In accordance with the present invention the sliding wall panel system is made up of a series of individual panels, mounted in line, on a single track, along which it may be moved from the opening to a storage area. Each panel is supported at its base by two guided, pivoted casters. These casters are constrained through the use of guide pins operating in guide grooves in the tracks, to follow predetermined paths. By the use of two guide grooves in each track, and through the use of auxiliary track sections having curved grooves, the two sides of the panel are controlled separately to stack the panels in the storage area. Advantageously by guiding the casters by means of the guides, it is possible to use flat-faced rollers and rails resulting in a stronger and more durable construction. A similar arrangement may be used at the head of the panel. However since the panels are fully supported and guided at the base, only one guide is required at the head to stabilize the panel against overturning. Two guides, of course, at the head may be used if desired.

The sliding wall panel is adapted to be used in a wall opening of a building to serve as an open-air supermarket and the like. A lower track assembly is provided which includes a double-grooved portion extending along the bottom of the opening in the wall and defining spaced guide grooves separated by a center rail. An upper track assembly is provided above the lower track assembly. A door storage area is provided adjacent the opening and the lower rail and the lower track assembly divides and diverges apart into a pair of spaced single-grooved track sections each including a rail and an adjacent groove spaced outwardly relative to the rails. The guide means on the casters ride in opposite grooves thereby respectively directing or controlling the forward and back ends of the sliding wall panel and guiding the panel into the storage area for stacking near to adjacent panels.

The panels will stack in a variety of acceptable patterns as required by the available storage area. For example, the panels can be stacked side by side.

According to another feature of the present invention, an improved caster for the sliding panel includes a flat-faced roller mounted on an axle and guide means extend from the caster and are adpated to be received in one of the guide grooves of the track to guide a respective end of the sliding wall panel.

In one preferred embodiment of the present invention there is provided a self draining track for use with a sliding wall panel and including a generally channel-shaped base member defining a drainage channel. A rail support extends across the channel and carries a rail. Flange means extend upwardly at opposite sides of the rail to define the guide grooves for receiving the guide means on the casters.

In accordance with yet another feature of the present invention means are provided for fastening the lower track to a building with suitable power tools, and thereafter for accurately leveling the rail of the track by suitable threaded members.

In yet another aspect of the present invention, there is provided a sliding wall panel having operable doors. The panel is free from interconnecting thresholds or other ties when the panel is in the closed position in the building opening. However, in order to slide the panel from its exposed position to the storage area, there is provided means for tying the doors together, and for locking the doors in the panel. Additionally there is also provided means which prevents movement of the panel unless the doors are locked together, and which prevents operation of the doors unless the panel is locked in position in the opening.

For a better understanding of the present invention reference may be had to the accompanying drawings wherein:

FIG. 4 is an isometric view of a typical sliding panel according to the present invention;

FIG. 5 is an end view of the panel of FIG. 4, illustrated with associated lower and upper track assemblies;

FIG. 7 is a plan view of the storage area of the panels for the arrangement illustrated in FIG. 6;

FIG. 11 is an isometric view of a lower caster and track assembly according to the present invention;

FIG. 12 is an isometric view of another embodiment of a lower caster and track assembly according to the present invention;

FIG. 13 is an end view of the caster and track assembly of FIG. 12;

FIG. 14 is a cross sectional view of a self draining lower track according to the present invention;

FIG. 15 is a cross sectional view of another embodiment of a self draining lower track adapted for power tool installation according to the present invention;

FIG. 16 is an isometric view of a sliding wall panel having operable doors according to the present invention;

FIG. 17 is an isometric view, somewhat schematic, of the latching mechanism of the operable door panel of FIG. 17.

Figure 1:
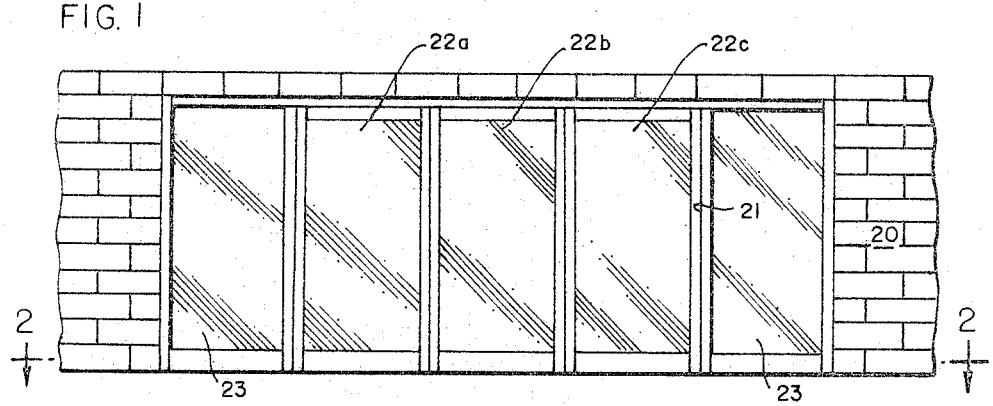
FIG. 1 is a fragmentary front elevational view of a building incorporating a sliding panel assembly according to the present invention.
Figure 2:
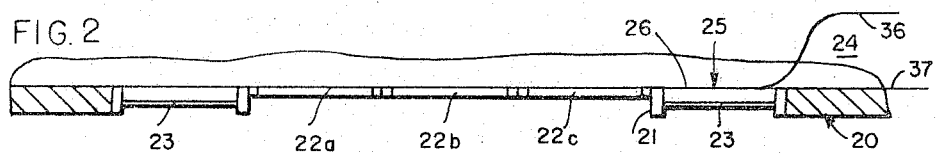
FIG. 2 is a cross sectional plan view of the building wall of FIG. 1 taken along line 2—2 of FIG. 1, illustrating the opening in the building and the storage area for the panels.

Referring now to the drawings, and particularly to the embodiment of FIGS. 1 through 5, there is illustrated the sliding wall panel and panel geometry according to the present invention. As therein illustrated there is shown a building wall 20 having an opening 21 closed by a plurality of wall panels 22a, 22b, 22c, collectively hereinafter referred to as 22. In addition, in the illustrated embodiment, there are provided a pair of fixed side panels 23 on respective sides of the opening 21. It is understood, of course, that any desired opening may be closed by the sliding panels according to the present invention. The panels 22 move along a track 25 alongside of the opening 21 and into a storage area 24.

Figure 3:
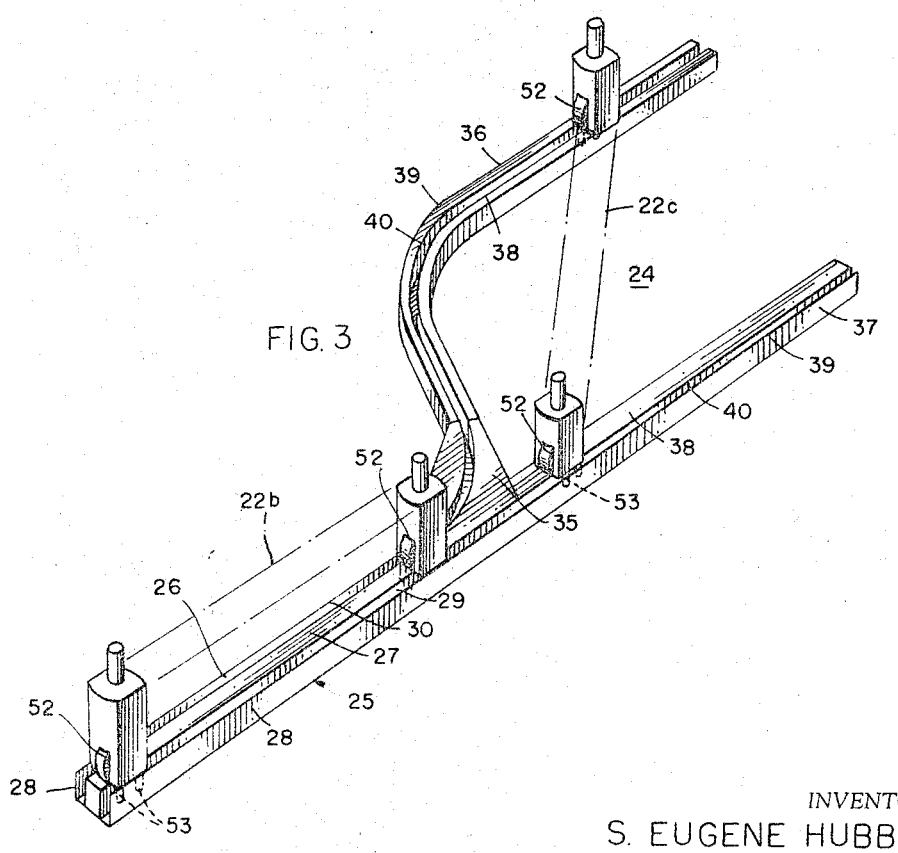
FIG. 3 is a schematic view of the track section of the panels of FIGS. 1 and 2, and illustrating the diverging track leading to the storage area.

Referring now to the track geometry, as best illustrated in FIGS. 3 and 5, the track across the opening 21 in the building 20 is a double-grooved portion 26 including a center rail 27 and a pair of spaced flanges 28 defining respective guide grooves 29, 30.

To provide for stacking of the doors in the door storage area 24, the rail 27 divides, as at 35, FIG. 3, into a pair of spaced single-groove track sections 36, 37. Each of the track sections 36, 37 includes a rail portion 38 and an outwardly spaced flange 39 providing a single groove 40 spaced outwardly from the rail portions 38.

To guide the top of the panel 22, there is provided an upper head track assembly 44, FIG. 5, adapted to receive a head guide, here shown as a roller 46. Although the panels 22 may be supported at two upper points by providing upper head track assemblies having spaced grooves for receiving respective ones of the rollers, the head track diverging in like manner as the lower track assembly into the storage area 24, it has been found that a single upper head guide is adequate in many instances.

To provide for guiding the panels 22 along the track 25 into the storage area 24, each of the panels 22 is provided with a pair of spaced lower casters 50 and 51, FIG. 4, each including a flat-faced roller 52 adapted to ride on a flat rail of the track 25, and a depending guide 53. The guides 53 of respective casters 50, 51 are received in opposite ones of the grooves 29, 30 so as to selectively guide the forward and back ends of the sliding door panel. The casters 50 and 51 are spaced apart a greater distance than the spacing between the single track sections 36 and 37, as best illustrated in FIG. 3, so as to afford stability to the panel when it is in the storage area.

From the preceding description it is evident that with the two lower casters placed on the rail of the double-groove track with their guides in opposite ones of the grooves, each caster will be constrained to follow the groove into which its guide means are engaged, as best illustrated in FIG. 3.

Although only the base or lower track means has been specifically illustrated, it is understood that the head as well as the base of the panel must be guided. It is possible to duplicate the entire dual guiding arrangement at the head. However this is unnecessary except possibly in the case of extremely large panels. Ordinarily one support at the head is sufficient to produce complete stability. In the illustrated tracking arrangement, the head track assembly 44 would be straight, following over the straight track 37, and eliminating the greater expense of a curved track.

Advantageously the present method of tracking can be extended to produce many useful handling and storage arrangements in addition to that illustrated in the embodiment of FIGS. 1 through 5. Several of the more obvious ones are illustrated in FIGS. 6 through 10. Referring now to the tracking geometry illustrated in FIGS. 6 and 7, there is illustrated a staggered stacking of the panels with the left hand stack being shown. As therein illustrated, there is provided a lower track 60 including a double-grooved section 61 and a storage section of single-groove track 62. Additionally a head track assembly 63 is provided. It will be seen that the double-groove track 61 diverges at the storage area to provide spaced track.

A plurality of panels 65 rides between the tracks 60 and 63. Each of the panels 65 has a pair of casters spaced at its opposite ends, and having guide means, here shown in the form of spaced pins 66, engaged within a respective groove 67, 68 of the track 60. Additionally each of the casters on the panels 65 has rollers (not shown in FIGS. 6 and 7) which ride on the rail 69 of the double-groove track section 61 and on the respective rails 70 and 71 of the single-groove track sections 62. Moreover each of the panels 65 has a head guide roller 72 fitted within a suitable head track assembly.

It will be understood that with the respective guide means 66 of the casters in opposite ones of the grooves 67 and 68, that the forward and back ends of the sliding panel will be guided along opposite paths to provide for the staggered stacking of the panels in the illustrated manner.

Figure 6:
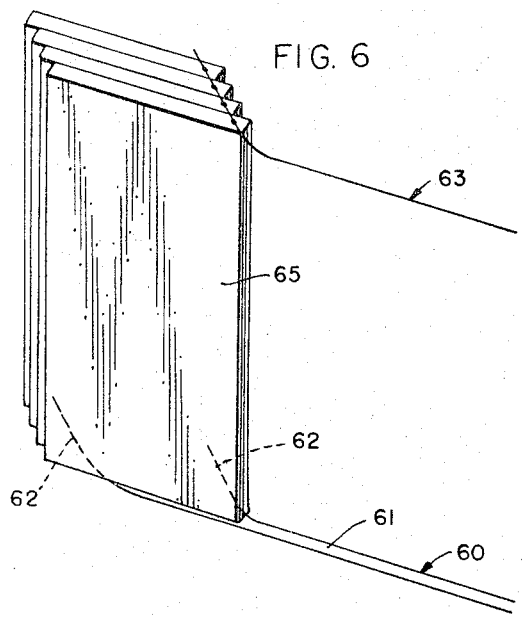
FIG. 6 is a schematic view of a stacking arrangement for a plurality of panels according to the present invention.
Figure 8:
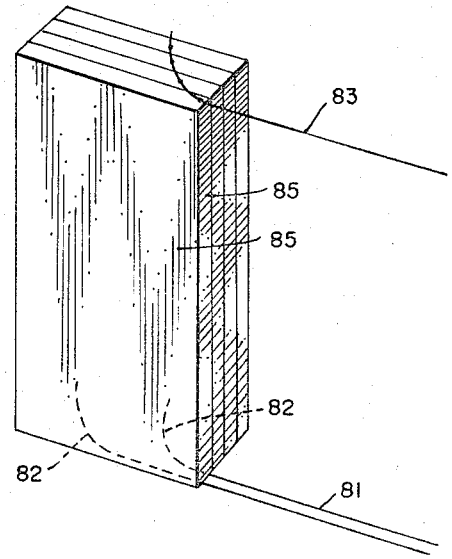
FIG. 8 is a schematic view of another stacking arrangement according to the present invention.
Figure 9:
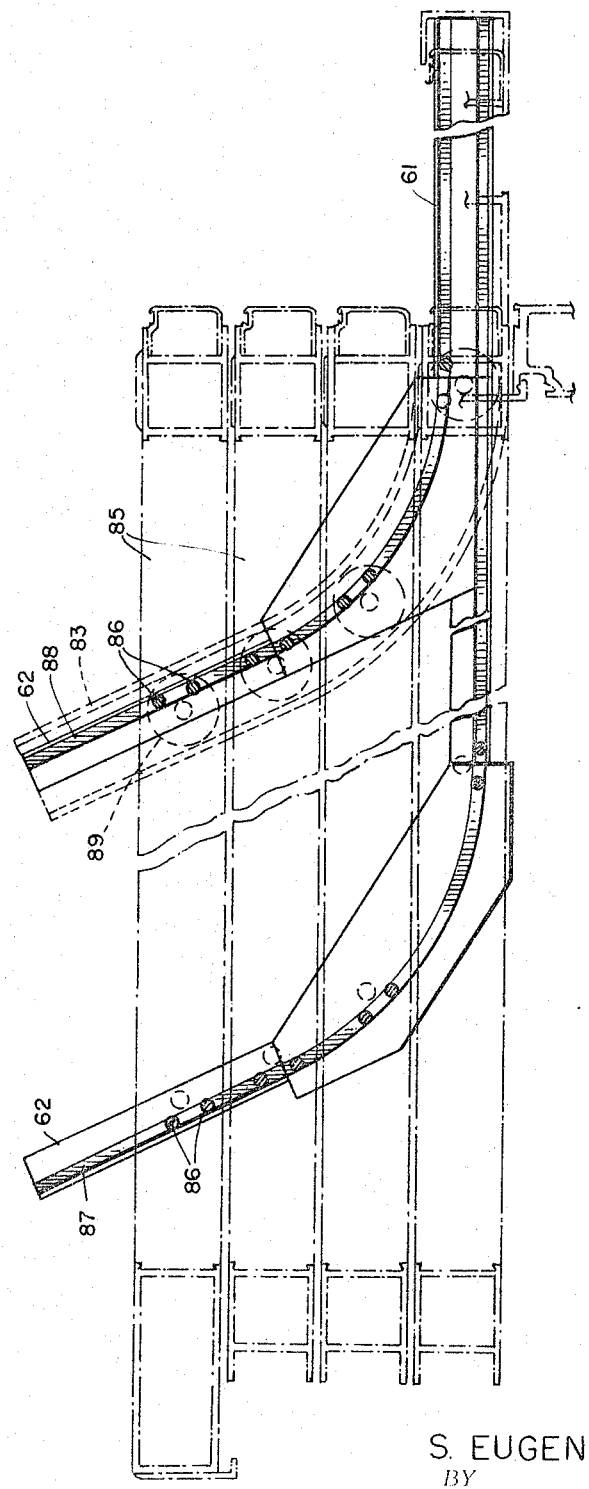
FIG. 9 is a plan view of the storage area for the arrangement illustrated in FIG. 8.

The stacking arrangement illustrated in FIGS. 8 and 9 is similar to that of FIGS. 6 and 8 except that the panels are stacked evenly rather than staggered. This is readily accomplished by placing the casters and rollers inward from the edges of the panels. Referring now to FIGS. 8 and 9, there is illustrated a track and panel storage arrangement including a double-groove track portion 81 and a single-groove track portion 82 in the storage area of the panels. An upper head track assembly 83 guides the upper edge of a plurality of panels 85. The casters on the panels 85 are spaced inward from the edges of the panels a varying distance so that the guide means, here shown as pins 86 of the respective casters, ride in opposite grooves 87, 88 of the single-groove track 62. Additionally a head guide roller 89 on each panel 85 rides in the head track assembly 83.

Advantageously the panels 85 in the embodiment of FIGS. 8 and 9 are neatly stacked in an even storage space to obtain maximum storage within a minimum space.

Figure 10:
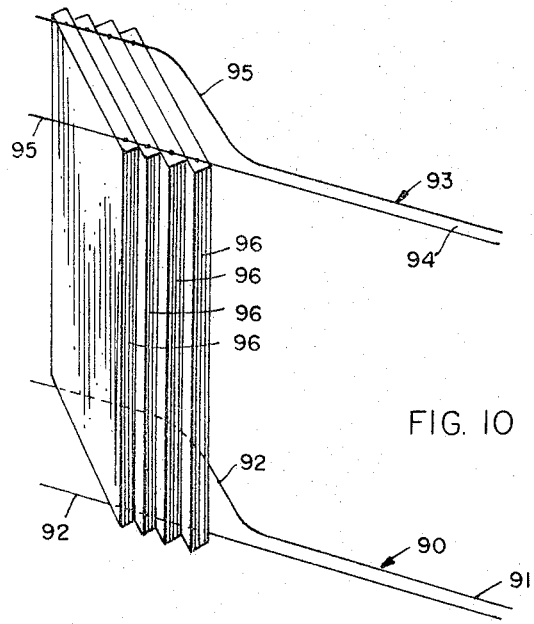
FIG. 10 is a schematic view of yet another stacking arrangement according to the present invention.

FIG. 10 illustrates schematically yet another stacking arrangement and, moreover, illustrates the use of a double-track upper guide. As therein illustrated, there is provided a track 90 similar to that heretofore described and including a double-groove section 91 and two diverging single-groove sections 92. Additionally there is provided an upper head assembly 93 including a double-track portion 94 and diverging single-track sections 95. A plurality of panels 96 are provided, each of which has a pair of spaced lower casters riding on the track 90 and having guide means received in the grooves of the track sections 91 and 92. Additionally each of the panels 96 is provided with spaced upper guides riding in respective grooves of the upper track assembly 93.

It will be seen from the above descriptions of track and storage layout that according to the present invention considerable flexibility is provided in the layout and storage of the track and panels.

FIG. 11 illustrates the caster 51 in greater detail. As therein illustrated, the caster 51 includes an inverted fork-shaped yoke 100 having a pair of spaced lower arms 102 extending from an upper shaft 103. The flat-faced roller 52 rides on the rail 27 and is supported on an axle 104 extending between the arms 102. Suitable guide means, here shown as the guide pins 53, extend from the lower edge of one of the arms 102 into the groove of a typical double-groove track portion 26.

A modified form of caster which will run with less friction in the tracks, which will not dig into the sides of the track grooves and consequently will permit the use of aluminum track and dividers, and which will avoid the possibility of the pins 53 straddling the rail, is illustrated in the embodiment of FIGS. 12 and 13. More specifically there is illustrated a caster 110 formed of an inverted fork-shaped yoke 111 defining spaced lower arms 112 extending from an upper shaft 113. A bight portion 111a of the yoke 111 is provided with a recessed aligning groove 114 adjacent one of the arms 112. A generally rectangular guide member 115 is supported on an axle 116 and has one edge 115a aligned within the groove 114 to position and stabilize the guide member. Advantageously the guide member 115 may be made of nylon to facilitate shaping of the member and to minimize friction in the track and scarring of the track sides. The portion of the guide member 115 adapted to ride within the guide groove is provided with chamfered portions 115b to permit the guide member to better follow the curvature of the groove as the track curves into the storage areas. A flat-faced roller 118 is mounted on the axle 116 and is adapted to ride on the rail 27 of the typical double-groove track section 26.

Although the trackage heretofore illustrated has been found suitable for the sliding wall panels according to the present invention, it has been found desirable in many installations to provide drainage means to the trackage since the sliding panels are normally exposed to the weather. The track system illustrated in FIG. 14 provides for an assembly of extruded members providing the functions of support, guidance, drainage, anchorage, disassembly for cleaning, and a screeding edge for concrete floors. More specifically there is illustrated in FIG. 14 a floor track assembly 120 including a generally channel-shaped gutter or base member 121 defining a drainage channel 122 and adapted to be cast directly into a concrete floor 123. The base member 121 is advantageously provided with outwardly extending flange elements 124, 125 defining screeding edges for tying the track 120 into the concrete floor 123. Additionally the base member 121 is provided with suitable extruded spines 126 to provide for securing end caps to the base member thereby to collect drainage from the base member into a suitable sewer or gutter and to facilitate the attachment of adjoining sections of nondraining trackage.

Additionally the track assembly 120 includes a suitable track member 130 having a rail support element 131 on which is formed a suitable rail 132 and a pair of spaced flanges 133 defining a spaced guide grooves 134. Cooperating parts are formed on the base member 121 and the track member 130 to interlock the sections. More specifically the base member 121 includes a locking groove 138 formed along the inner surface of one of its side walls, and a flange portion 139 adapted to interlock within the locking groove 138. Moreover a hook member 140 extends from the opposite side wall of the base member 121 and a complementary hook portion 141 extends from the side edge of the track member 130 to interlock with the hook member 140. An intermittent key strip 142 positioned between the hook portion 141 and the adjacent side wall of the base member 121 prevents accidental disengagement of the hook portion 141 from the hook member 140 under wind or other side loading of the panels. Moreover an intermittent resilient stuffer 142a fitted in suitable indents 143 and 144 prevent accidental removal of the key strip 142.

To provide further structural stability to the track member 130, an elongated center support or flange 145 extends under the rail 132 and against the bottom surface of the base member 121.

Frequently it is desirable to provide for power tool installation of track on an existing or new floor, with subsequent leveling of the track and grouting thereof. Moreover it may be desirable to provide for such power tool installation and leveling of conventional track, of the type illustrated in the embodiments of FIGS. 1 through 5, or of the self draining track. FIG. 15 illustrates a self draining track structure which is adapted to be power tool installed and screw leveled. As therein illustrated, there is shown a track supported on a plurality of spaced track shoe supports or runners 150 of generally channel-shaped cross-section and provided with lower flanges 151 having inwardly extending slots 151a to provide for lateral alignment in case the track should be secured with screws instead of power driven studs. Spaced upstanding side legs 152 and 153 on the shoe supports 150 terminate in inwardly extending, confronting flanges 154. Additionally there is provided a general channel-shaped base member 160 defining a drainage channel and provided with outwardly extending side flange elements 161 defined by intermittent or spaced clips and snapped to the base portion through interlocking hook members 162 and 163 and interfitting flanges 164 and 165. The outwardly extending side flange elements 161 are formed of sheet material having a reverse bend and provided with a screw aperture 166 in its lower surface through which passes an adjusting screw 167. Another opening 168 aligned with and spaced above the screw opening 166 is sufficiently large to permit insertion of a screw driver or other tool to engage the head of the screw 167, but is sufficiently small to prevent the screw 167 from dropping through the hole 168. The screws 167 are threaded into threaded apertures 169 in the flanges 154.

To support a rail 172 there is provided a rail support element 174 of bent sheet material and including downwardly extending flanges 175 at its edges which engage within upwardly opening grooves 176 defined in the side walls of the base member 160. Moreover the rail support element 174 includes spaced downwardly extending projections 177 forming detents 178 effective to snap the rail support member 172 into engagement with the base member 160. The rail 172 may be secured to the rail support element 174 in any suitable manner as with bolts.

To define suitable guide grooves 180 and 181 on respective sides of the rail 172, the base member 160 is provided with upwardly extending flange means 182 spaced apart from the rail 170 in parallel relation therewith.

The track assembly is illustrated with a cooperating typical caster 51 including a flat-faced roller 52 and suitable guide pins 53.

From the above brief description, the installation and operation of the track assembly according to the embodiment of FIG. 15 is believed clear. However, briefly, the spaced shoe supports 150 are attached to the base member 160 by the spaced clips 161 with the screws 167. The base member 160 and the shoe supports 150 are installed in the floor recess as a unit, and the track is later adjusted to level.

It is frequently necessary to provide operating door entrance panels in the wall panel system according to the present invention. FIG. 16 illustrates a sliding panel having center-pivoted operating doors. The door hardware prevents movement of the panel unless the doors are locked together, and further prevents operation of the doors unless the panel is locked in position in the opening. Moreover, advantageously this is accomplished without the use of a threshold by providing the necessary structural ties and locks through the doors themselves.

Referring now to FIG. 16, there is illustrated an operating door panel 190 according to the present invention. The door panel 190 includes a frame 192 having two spaced vertical mullions 193 and 194 interconnected across the top by suitable transom means. As herein illustrated the transom means includes spaced horizontal transom bars 195 and 196 enclosing a glass transom glass 197. The panel 190 accepts a pair of center-pivoted doors 200, 201 of generally conventional design, each including spaced tubular vertical stiles 202, 203 and 204, 205. The respective stiles are interconnected by upper and lower horizontal tubular members 206, 207 and 208, 209, respectively. The door frames support suitable door glass 212, 213, respectively. Moreover suitable push or pull bars 214, 215 are provided on respective ones of the doors 200, 201. The doors 200 and 201 are pivoted at their upper ends in a conventional manner, and at their lower ends by brackets 218 and 220 extending inwardly from the respective mullions 192 and 194 thereby providing the center pivoted door supports.

To provide for sliding the operating door panel 190, the door panel 190 is provided with casters and rollers in the manner heretofore described, similar to that illustrated in FIGS. 4 and 5. More specifically the operating door panel 190 includes the pair of spaced casters 50, 51 each including a roller 52 and suitable guide means 53. In addition there is provided the head guide roller 46 at the top of mullion 194.

Figure 18:
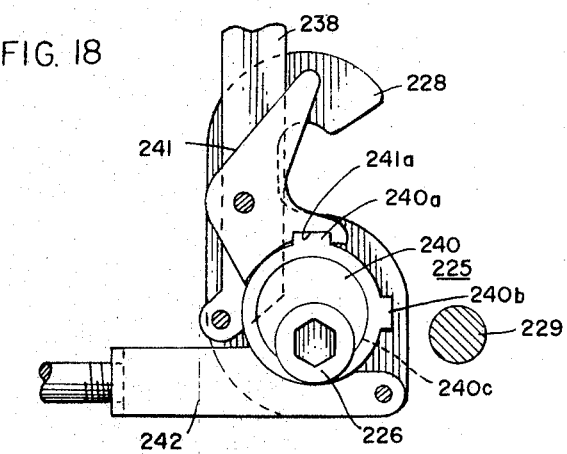
FIGS. 18, 19, and 20 are cross sectional views of the latching mechanism of FIG. 17 shown in different positions of actuation.

In order to latch the doors 200 and 201 together so as to prevent movement of the panel 190 unless the doors are locked together, and to prevent operation of the doors unless the panel is locked in position in the opening, there is provided a latching mechanism generally illustrated at 225 in FIGS. 17 through 20. The latching mechanism 225 is shown in FIGS. 17 and 18 positioned for normal door operation with the door panel 190 locked in place in the opening. The latching mechanism 225 is positioned within the tubular lower member 208 and tubular stile 203 in the door 201 to be completely enclosed except for an hexagonal operating socket 226 adapted to receive an Allen wrench and exposed through the wall of the lower horizontal member 208.

Referring now to the latching mechanism 225, the latching mechanism includes a tie hook 228 adapted to tie into an eye or clevis member 229 in the adjacent edge of the door 200, a bolt member 230 adapted to raise into the lower transom bar 196, and a locking pin 232 fitting through the pivot hole in the pivot bracket 218 and into a hole 233 in the track or floor 234 of the structure.

The operating linkage is effective to simultaneously project the bolt member 230 into the lower transom bar 196, to engage the tie hook 228 with the clevis member 229, and to disengage the locking pin 232 from the opening 233 to change from the normal illustrated position to a door latched and panel released position wherein the panel may be moved along the track.

It will be appreciated that in accordance with the present invention the sliding panels are located in the building opening in a single plane, on a single floor mounted track. By the use of guided casters and transverse diverging guide grooves, panels are stored parallel to one another. A wide variety of storing arrangements are possible. The weathering of exterior panels is facilitated through self draining trackage. Moreover tracking embodiments are provided for power tool installation of the track to prelaid or existing flooring. Advantageously an improved operating door panel is provided with the elimination of floating thresholds or saddles in the entrance units.

The bolt member 230 is operated through a bolt clevis 238 connected to the bolt member 230 through a bolt rod 239. The bolt clevis 238 is pivotably mounted to the tie hook 228. The tie hook 228 is rotatable clockwise, as indicated by the arrows in FIG. 17, by means of a cam 240 and trigger 241. The cam 240 is formed integrally with the operating socket 226 and includes a pair of spaced detents 240a and 240b and a round eccentric 240c which is rotatable within a corresponding round opening in the tie hook 228. The trigger 241 is also pivotably mounted on the tie hook 228 and includes a notch 241a to receive one of the detents 240a of the cam 240.

Simultaneously with the ejection of the bolt member and locking of the tie hook, an additional clevis member 242 moves through the lower horizontal member of the door 201 upon rotation of the tie hook 228. More specifically the clevis member 242 is pivotably mounted on the tie hook 228 and is connected to the locking pin 232 through a tie rod 243, a pivot rod 244 pivoted about axis $x$, and an additional tie link 245, to actuate a pin pivot member 246 pivoted about axis $y$. The pivot member 246 has one arm 246a extending through an opening 232a in the locking pin 232 to effectuate vertical movement of the locking pin 232.

Figure 19:
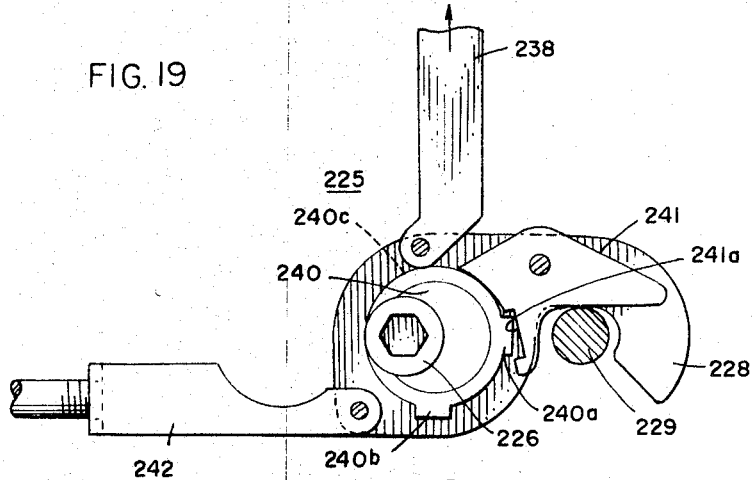

From the above description of the latching mechanism 225, its operation is believed clear. However, briefly, it will be understood that when it is desired to slide the panel 190 from the door opening, and with the doors 200 and 201 in their normal operating position, it is first necessary to insert an Allen wrench into the operating socket 226 to rotate the socket and associated cam 240 clockwise, as indicated by the arrows in FIG. 17. The cam 240 is locked to the tie hook 228 by the trigger, the detent 240a fitting into the notch 241a. Initial rotation of the operating socket 226 therefore is effective to initially project the bolt member 230 upwardly through a suitable opening in the lower transom bar 196, and further to initially actuate the clevis member 242 to partially raise the locking pin 232, and to bring the tie hook 228 over the clevis member 229 in the door member 200, as best illustrated in FIG. 19 of the drawings. At this point the trigger member 241 strikes the clevis member 229, thus swinging away to release the detent 240a on the cam 240.

Figure 20:
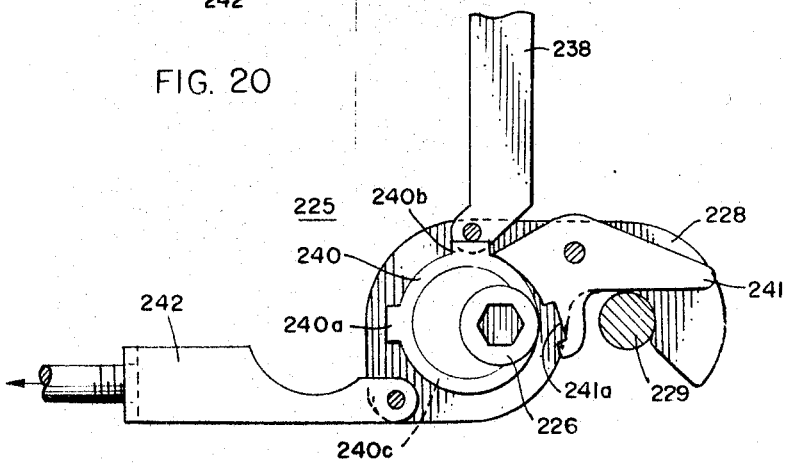

The cam 240 is then rotated an additional 180° to a position where the other detent 240b strikes against the heel of the trigger 241 to prevent overtravel. This final half turn of the operating socket is effective to cause the eccentric 240c to rotate within the opening on hook member 241, moving the hook member 228 to the left as viewed in FIGS. 19 and 20. This draws the doors 200 and 201 together and completes the release of the doors by removal of the pin 232 from the opening 233 in the floor 234, as best indicated in FIG. 20. Thus the doors 200 and 201 are effectively locked together, and the doors are locked into their frame preventing their acting as a toggle to impose excessive loads on the panel frame. Moreover the locking pin 232 has been retracted from the track and frees the entrance panel for movement to the storage area.

A reverse rotation of the operating socket 226 reverses the procedure to reset the trigger for the next cycle of operation.

Although various embodiments and features of the invention have been described, it will be apparent that numerous other modifications and embodiments will be devised by those skilled in the art which will fall within the true spirit and scope of the present invention.

What is claimed as new and desired to be secured by Letters Patent of the United States is:

1. A guided caster for a sliding panel and the like comprising an inverted fork-shaped yoke including an upper shaft integrally formed with a lower bifurcated portion defining spaced apart arms, an axle extending between said arms, a flat-faced roller mounted on said axle, and guide means adapted to be received in a guide groove of a track and extending from said portion below the lower edge of said roller, said yoke being provided with a recessed aligning groove adjacent its arms and said guide means including a guide member supported on said axle and having an upper edge aligned within said groove and having a lower portion elongated in the direction of travel of said roller and adapted to be received in said guide groove.

2. A guided caster as set forth in claim 1 above wherein said guide member is formed of nylon.

3. A guided caster as set forth in claim 1 wherein said lower portion is chamfered.

References Cited

UNITED STATES PATENTS

| | | | |
|---|---|---|---|
| 1,448,845 | 3/1923 | Johnson et al. | 49—420 |
| 2,657,436 | 11/1953 | Fairhurst et al. | 49—127 |
| 2,944,282 | 7/1960 | Greco | 49—425 |
| 3,033,285 | 5/1962 | Banner | 49—425 |
| 3,261,129 | 7/1966 | Brydolf et al. | 49—411 |

FOREIGN PATENTS

| | | |
|---|---|---|
| 955,968 | 7/1949 | France. |
| 665,263 | 9/1938 | Germany. |
| 374,684 | 9/1939 | Italy. |

DAVID J. WILLIAMOWSKY, *Primary Examiner.*

KENNETH DOWNEY, *Examiner.*